Nov. 28, 1950 D. D. GRIEG 2,531,425
HOMING BEACON RECEPTION SYSTEM
Filed Dec. 11, 1947
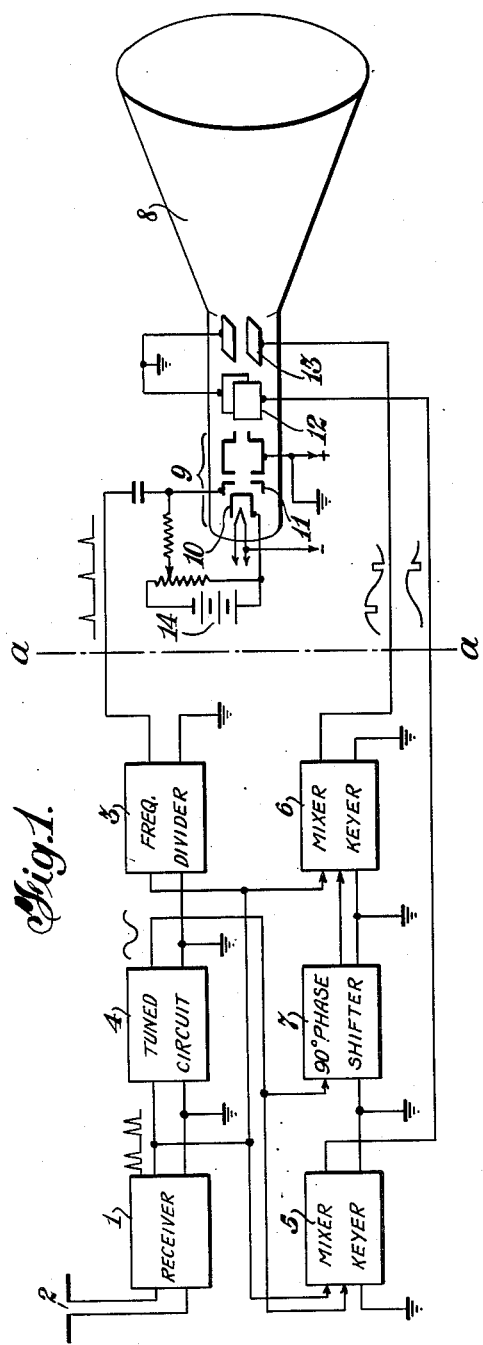
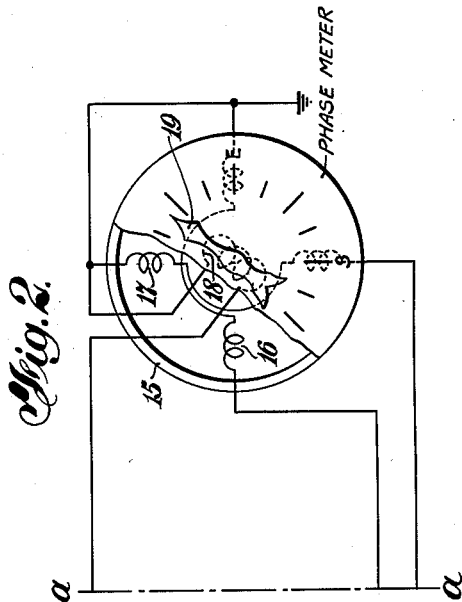
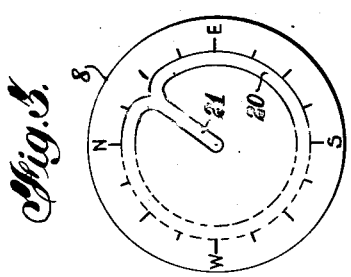
INVENTOR.
DONALD D. GRIEG
BY
*RPMorris*
ATTORNEY

Patented Nov. 28, 1950

2,531,425

UNITED STATES PATENT OFFICE 2,531,425

HOMING BEACON RECEPTION SYSTEM

Donald D. Grieg, Forest Hills, N. Y., assignor to International Standard Electric Corporation, New York, N. Y., a corporation of Delaware Application December 11, 1947, Serial No. 791,039

8 Claims. (Cl. 343—102)

This invention relates to receiving system for radio beacons and more particularly to improvements in such systems which are designed to expedite the determination of an azimuth reading.

My invention is particularly useful for the reception of time-modulation displacements of a series of pulses which are radiated by a transmitting beacon. In such a system, the time displacement of the pulses is obtained by modulating a carrier wave differently for different sectors of the compass chart so that the time displacement of the pulses with respect to similar pulses if uniformly spaced apart in time is a function of the direction of the beam at any instant.

In carrying out my invention I translate the signals as received from a radio beacon into three components, one of which corresponds to the time-displaced pulse itself, while the other two are converted into sine wave functions, one having a 90° phase displacement with respect to the other. As will be explained in the more detailed description to follow, these three components of the detected signals are so coordinated in the control of indicating means as to provide an automatic showing of the azimuth of the beacon with respect to a compass direction from the point of reception.

It is an object of my invention to provide improvements in a radio beacon system which will contribute toward greater speed and accuracy of obtaining a directional indication.

Another object of my invention is to provide a circuit arrangement operable through a radio receiver for translating a radio beacon signal into an azimuth indication.

Still another object is to provide a navigation aid wherein time modulated displacements of a series of pulses produces an indication of the direction in which a radio beacon lies.

My invention will now be described in more detail, reference being made to the accompanying drawings in which:

Fig. 1 shows diagrammatically a circuit arrangement, the components of which are suitably coordinated for translating the received signals into directional indications and for showing such indications on the screen of a cathode ray tube.

Fig. 2 shows a modification which differs from the circuit arrangement of Fig. 1 only with respect to the part thereof to the right of the dividing line a—a. This modification substitutes a phase meter for the cathode ray tube; and Fig. 3 shows a typical indication of the azimuth as produced on the fluorescent screen of a cathode ray tube.

Referring first to Fig. 1, I show a radio receiver 1 controlled by radiant energy which is collected on an antenna 2. This antenna is preferably of a type best suited to the chosen carrier frequency of the system. The usual functions are performed by the radio receiver, namely, to derive by heterodyning, amplifying and detecting a modulation output which is capable of use in my improved beacon signal receiving system for obtaining an azimuth indication.

As previously stated, the time displacement of the signal pulses is varied in accordance with the compass direction in which they are radiated from a given beacon. Considering pairs of pulses the first has a leading phase departure and the second has a lagging phase departure from a reference instant. With no phase departure the two pulses converge into one. This convergence may correspond with an aiming of the radiant energy beam due north from the beacon.

If the receiver were to be due north of the beacon, the periodicity of the convergent pulses as received may be considered the uniform pulse period with respect to which the time displacements of each pulse in a pair are equal and opposite. The measurement of the time displacement corresponds to a given direction of the beacon, so that if the compass points from the receiver are known the azimuth of the beacon may easily be reckoned. During a 360° revolution of the beacon the phase displacement of the pulses may amount to as much (but nor more) as 180° in order to identify the compass direction of the beam. So, preferably, the phase of the pulses is shifted by 1° with every 2° of rotation of the beam.

As shown in Fig. 1 the time modulation output from the receiver is fed to four circuit units 3, 4, 5 and 6. Unit 3 is a frequency divider which suppresses one pulse of each pair. Unit 4 is a tuned circuit the resonant frequency of which corresponds to the periodicity of the pulse pairs. This unit generates a synchronized sine wave. Units 5 and 6 are mixing and keying circuits. Unit 5 combines the sine wave output from unit 4 with the pulse modulations fed directly from the receiver 1. The same pulse modulations are fed to unit 6 and there combined with a phase-shifted output component from the tuned circuit 4. Unit 7 shifts the phase of this component by substantially 90°. Inch each of the mixer stages 5 and 6 the sine wave is momentarily reduced to a zero voltage at the instant of detection of the modulation pulse. The relation between this zero voltage and the phase of the sine wave is utilized to produce the azimuth indication.

Synchronizing of the sine wave with the pulse pairs is quite feasible despite the variable time displacements of the single pulses for the reason that such displacements are equal and opposite.

The mixer-keyer unit 6 is similar to the unit 5, but is made to operate in 90° phase relation thereto. In order to accomplish this result, a phase shifting circuit 7 is interposed between the output terminals of unit 4 and the input circuit of unit 6 which is to receive the sine wave component.

Since the sine wave output from each of the units 5 and 6 is characterized by a momentary reduction to a zero value at the instant of arrival of the time displaced pulses, it will be apparent that these units may be utilized to control an indicating device such as a cathode ray tube. Fig. 1 shows such a tube 8 having the usual construction of an electron gun 9 which includes a cathode 10 and focusing electrodes generally indicated in the gun unit, also a control electrode 11. Beam deflecting electrodes 12 are used for obtaining a horizontal deflecting component, while electrodes 13 are used for obtaining a vertical deflecting component. Two of the electrodes 12 and 13 are grounded, while their diametrically opposed electrodes are separately connected to the output circuits of the mixer-keyer units 5 and 6 respectively.

In the absence of modulation of the pulses, the sine wave output from units 5 and 6 would produce rotary scanning of the electron beam. Since, however, the modulation pulses are applied to both of the units 5 and 6 at the same instant, the effect will be to reduce the deflecting potentials to a zero value and restore the electron beam to its axis of rotary deflection. At the instant when the pulse becomes effective to return the beam to its axis, the screen will be illuminated along a radial line and as the coating of the screen is of a character which will cause persistence of the image, a more or less steady showing of such an image may be obtained by successive rotations of the beam through the scanning action. As the measurement of azimuth changes, the position of the radial line will correspondingly change.

By suppressing the effects of one pulse in each pair it is possible to produce a single radial trace of the electron beam on the screen of the cathode ray tube. This avoids the confusion that would exist if it were necessary to view two radial traces and to choose which of the two to accept as the azimuth indication. Accordingly it is arranged that the pulse which has a leading phase relation, or the one which has a lagging phase relation shall be suppressed by causing the output from the frequency divider to act upon the grid 11 in such a way as to cause electron emission from the electron during a moment when the output from the frequency divider 3 is more positive than a blocking bias which may be derived from a biasing source 14; and at other times, for suppression of the unwanted pulse, the cut-off bias prevails.

Referring now to Fig. 2, I show therein a phase meter of conventional type, being given the general reference 15. This meter comprises stationary field windings 16 and 17 and a moving coil 18 which is subject to the influence of the magnetic field produced by the coils 16 and 17. The indicating pointer 19 is mounted on the inductive rotor member which includes the coil 18.

The phase meter may serve in place of the cathode ray tube for making indications of phase difference between the applied modulation pulses and a reference phase of the sine wave outputs from the tuned circuits. A rotary field is developed by the stationary field coils 16 and 17. The rotor 18 is so energized by the output from the frequency divider 3 as to cause it to assume a position indicative of the time displacement of one pulse in each pair. An indication of azimuth is, therefore, obtained corresponding to what would be shown on the screen of the cathode ray tube.

The modulation frequency, or pulse rate of the beacon signals, is found to be too high in certain cases, for reliable measurement of the time displacements of the pulses by means of a phase meter. In such cases, therefore, it is preferable to add to the components of my novel system a frequency divider which may be directly controlled by output from the receiver 1. This frequency divider delivers its lower frequency output to the units 3, 4, 5 and 6 the same as though the signals were to come directly from the receiver 1. By this arrangement the time displacements of the pulses are capable of translation into azimuth measurements in the same manner as previously described.

Fig. 3 shows a representation of the cathode ray tube screen wherein the rotary scanning action applied to the electron beam normally follows a circular path 20. The radial line 21 is produced by simultaneous reduction of output from the two units 5 and 6 to a zero value. The utilization of only those pulses which, say, have a leading phase relation to the reference phase of the sine wave, and the suppression of indicating effects of the pulses having a lagging phase relation avoids tracing two radial lines to the center of the screen.

My invention is capable of modification in various ways, as will be readily appreciated by those skilled in the art.

I claim:

1. The method of translating directive radio signals which are characterized by different time displaced pulse modulations according to the direction in which they are propagated, said method comprising generating sine wave energy of a frequency corresponding to the average pulse rate of said modulations, producing an electron stream and deflecting the same rotatively by means of said sine wave energy in combination with a phase-displaced derivative thereof, mixing the pulse energy of said signals with said sine wave energy and with said phase-displaced derivative, thereby to momentarily interrupt the deflection of said electron stream, and suppressing the effects of every second pulse, thereby to produce an azimuth indication from the angular position of said stream when its deflection is interrupted.

2. Apparatus for producing an azimuth indication in response to the reception of time-modulation pulse signals which are radiated by a beacon, comprising means for producing a rotating field the cycles of which are maintained in synchronism with the average rate of said pulse signals, means for suppressing the effects of every second pulse, and means for translating the retained pulse effects into an azimuth indication, the last said means being operable in response to the derivation of the phase comparison effect as between said rotating field and the phase of the retained pulses.

3. Apparatus according to claim 2 wherein said rotating field producing means includes deflecting circuits and beam deflecting electrodes in a cathode ray tube, said tube being a component of said translating means and being operable under control of said retained pulse effects to produce said azimuth indication as a radial trace on a screen at one end of said tube.

4. Apparatus according to claim 2 wherein said rotating field producing means includes stationary coils in a phase meter, said meter being a component of said translating means and having a rotor on the winding of which is impressed said retained pulse effects.

5. Apparatus for producing an azimuth indication comprising means for receiving and demodulating a train of signals which are radiated from a remote beacon and are characterized by different time displaced pulse modulations according to their direction of propagation, means for generating sine wave energy of a frequency corresponding to the average pulse rate of said modulations, a discharge tube having an electron gun, a screen and beam deflecting means including circuits for causing rotary deflection of the electron beam, this means including a phase shifting network and direct connections between said sine wave generating means and said beam deflecting means, means for suppressing the effects of every second pulse in said train of signals, and means responsive to the retained pulses for producing a radial trace of said beam, thereby to indicate on the screen of said tube the azimuth of said beacon.

6. Apparatus according to claim 5 and including a control electrode in said discharge tube, and means for biasing said control electrode to cut-off during the reception of the pulses which are to be suppressed.

7. Apparatus for producing an azimuth indication comprising means for receiving and demodulating a train of signals which are radiated from a remote beacon and are characterized by different time displaced pulse modulations according to their direction of propagation, means for generating sine wave energy of a frequency corresponding to the average pulse rate of said modulations, a phase meter having stationary field coils and a rotor on which is mounted a pointer for movement over a scale, means including a phase shifting network and direct connections between said sine wave generating means and said field coils for producing a rotating field, means for suppressing one of each pair of pulses in said train of signals, and means for utilizing the other pulse in each pair to so energize said rotor that it will move with its pointer and assume a substantially steady position which is indicative of said azimuth.

8. Apparatus according to claim 7 in which said pulse suppressing means includes a frequency divider.

DONALD D. GRIEG.

REFERENCES CITED

The following references are of record in the file of this patent:

UNITED STATES PATENTS

| Number | Name | Date |
| --- | --- | --- |
| 2,403,626 | Wolff et al. | July 9, 1946 |
| 2,406,468 | Loughlin | Aug. 27, 1946 |
| 2,444,445 | Isbister | July 6, 1948 |